United States Patent [19]
Yahata et al.

[11] Patent Number: 5,837,801
[45] Date of Patent: *Nov. 17, 1998

[54] METHOD FOR PREPARING CROSSLINKED POLYCARBODIIMIDES

[75] Inventors: Ken Yahata; Hiroshi Miyoshi; Yasuyuki Takiguchi; Yasuyoshi Komoto; Akira Hayashida, all of Kawasaki, Japan

[73] Assignee: Shin-Etsu Chemical Co., Ltd., Tokyo, Japan

[*] Notice: The term of this patent shall not extend beyond the expiration date of Pat. No. 5,821,325.

[21] Appl. No.: 759,381

[22] Filed: Dec. 4, 1996

[30] Foreign Application Priority Data

Dec. 5, 1995 [JP] Japan ................................ 7-316325

[51] Int. Cl.$^6$ ........................... C08G 73/10; C08G 95/04
[52] U.S. Cl. .................. 528/310; 528/170; 528/322; 528/353; 528/373; 528/374; 528/375
[58] Field of Search ....................... 528/373, 322, 528/170, 353, 310, 374, 375

[56] References Cited

U.S. PATENT DOCUMENTS

| | | | |
|---|---|---|---|
| 2,941,966 | 6/1960 | Campbell | 260/25 |
| 3,947,274 | 3/1976 | Mikawa et al. | 96/107 |

FOREIGN PATENT DOCUMENTS

| | | |
|---|---|---|
| 0 443 524 | 8/1991 | European Pat. Off. . |
| 2 242 331 | 3/1975 | France . |
| 2 579 600 | 10/1986 | France . |
| 2423482 | 12/1974 | Germany . |
| 61-235414 | 10/1986 | Japan . |
| 61-268714 | 11/1986 | Japan . |
| 2292316 | 12/1990 | Japan . |
| 3247504 | 11/1991 | Japan . |
| 3247505 | 11/1991 | Japan . |
| 4279618 | 10/1992 | Japan . |
| 7140144 | 12/1996 | Japan . |
| 7140145 | 12/1996 | Japan . |

OTHER PUBLICATIONS

J. Org. Chem., 28, p. 2069 Aug., (1963) "High Polymers Containing the Carbodiimide Repeat Unit".
Arch. Pharm., Verlag Chemie GmbH, vol. 305, p. 654 (Sep. 1972).
An. Quim. 67, p. 901, (Nov., 1971) "Additions do Di–(p–Nitrophenyl)–carbodiimide, Role of Nitrogen Lone Pair in Additions to Carbodiimides".
J. Org. Chem. 34, 3707 (Nov., 1969); "Alkylation by Alcohols in The Presence of Dicyclohexylcarbodiimide".
J. Chem. Soc. (C), Dec., 1968, p. 1480.

*Primary Examiner*—P. Hampton Hightower
*Attorney, Agent, or Firm*—McAulay Nissen Goldberg Kiel & Hand LLP

[57] ABSTRACT

The method for preparing a crosslinked polycarbodiimide according to the present invention comprises reacting a polydicarbodiimide compound with a compound, which has in a molecule thereof two or more hydroxy or mercapto groups, in the presence of an alcoholate of an alkali metal or of an alkaline earth metal. The crosslinked polycarbodiimide obtained according to the method is excellent in heat resistance and mechanical properties.

7 Claims, 1 Drawing Sheet

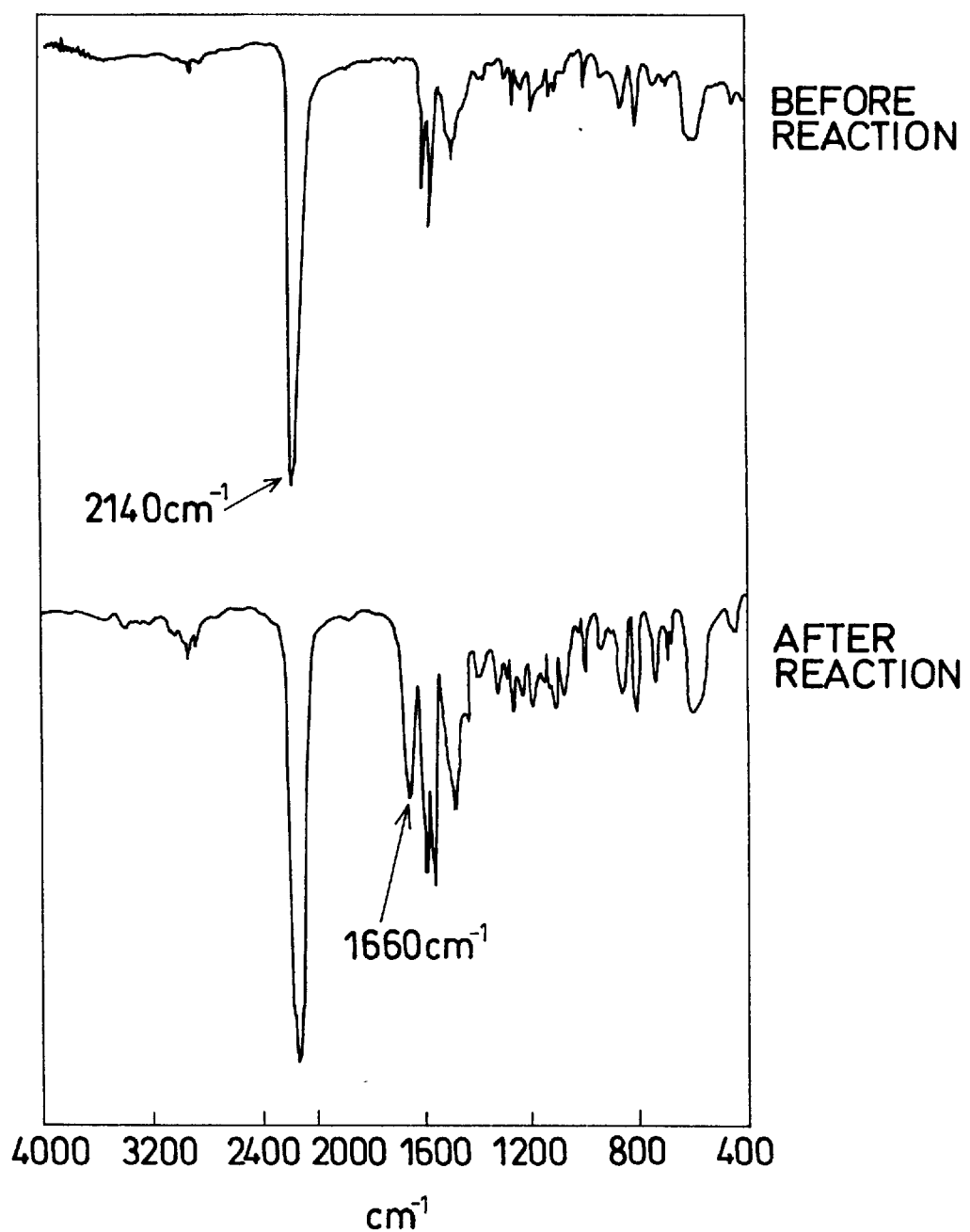

METHOD FOR PREPARING CROSSLINKED POLYCARBODIIMIDES

FIELD OF THE INVENTION AND RELATED ART STATEMENT

The present invention provides a highly functional material, a polymeric material having an excellent heat resistance and mechanical properties, and an inorganic material having a high-level heat resistance by introducing specific functional crosslinking agents into a polymer which has reactive functional groups comprising carbodiimide linkages.

A low molelcular weight carbodiimide, such as dicyclohexylcarbodiimide, diisopropylcarbodiimide, di-p-toluoylcarbodiimide or the like, is a highly reactive reagent commonly used for a dehydrating condensation and is used in such fields as ester synthesis and peptide synthesis.

Meanwhile, a polycarbodiimide having a plurality of carbodiimide linkages in a molecule is generally prepared by a decarboxylating condensation of a diisocyanate in the presence of a carbodiimidization catalyst in an appropriate solvent. Such a polycarbodiimide which derives from an aromatic diisocyanate in particular is known to be useful as a heat resisting polymer (J. Org.Chem., 28, 2069(1963) and U.S. Pat. No. 2,941,966).

A carbodiimide linkage is known to react with a hydroxy-bearing compound such as an alcohol to form an isourea-type addition product. Despite the high reactivity of the carbodiimide linkage, however, it has been reported that the above-mentioned reaction requires excessive quantities of reagents and reaction conditions including a high temperature and a long reaction time (J.Org. Chem., 34, 3707(1969)). Other disadvantages of the reaction include a low yield of reaction, difficulty in completing the reaction and difficulty in controlling the reaction.

The present inventors have found that a polycarbodiimide in particular exhibits a considerably lower reactivity than a low molecular weight carbodiimide. That is, a polycarbodiimide in a solid state is very stable and entirely non-reactive to the above-mentioned reagents. In addition, even if a polycarbodiimide is dissolved in a solvent, it hardly reacts with the above-mentioned reagents even under a rigorous condition. Accordingly, a method whereby a hydroxy- or mercapto-bearing compound is reacted with a polycarbodiimide having a high molecular weight is not known, nor is known a method whereby a compound which has in a molecule thereof two or more hydroxy or mercapto groups is reacted with a polycarbodiimide to produce a crosslinked polymer.

On the other hand, it has been reported that to the reaction between a carbodiimide and an alcohol a catalyst is effective which is exemplified by a trialkyllead alkoxide (J.Chem.Soc. (C), 1480 (1968), fluoroboric acid (Arch. Pharm. (Weinheim), 305, 654 (1972)) and zinc chloride (German Patent No.2,423,482). However, since these catalysts contain a heavy metal or are strongly acidic, they entail such problems as environmental pollution in a post-treatment stage or the necessity of strict caution in handling. And, although the use of sodium alkoxide has been reported for a reaction with a low molecular weight carbodiimide (An. Quim., 6, 901 (1971), no report has been made as to the use of sodium alkoxide for a reaction with a high molecular weight polycarbodiimide.

As disclosed by Japanese Patent Application Laid-Open (JP-A) Nos. 3-247,504 and 3-247,505, a polycarbodiimide undergoes a thermal crosslinking reaction to finally provide a glassy carbon. Japanese Patent Application Laid-Open(JP-A) Nos.61-235,414 and 61-268,714 discloses a method whereby a polycarbodiimide is crosslinked through a trimerization of carbodiimide linkage of polycarbodiimide.

However, nothing is known about a method whereby a crosslinked polycarbodiimide having a high molecular weight is crosslinked by a compound which has two or more hydroxy or mercapto groups or about a method whereby the foregoing polycarbodiimide is converted into an inorganic substance.

SUMMARY OF THE INVENTION

The present invention provides a method for easily preparing a crosslinked substance having a variety of functions and mechanical properties by using as a starting material a polymeric compound having a plurality of carbodiimide linkages.

In addition, the present invention provides a method for preparing a novel material by further crosslinking the carbodiimide linkage remaining in the foregoing crosslinked substance.

The present inventors have conducted studies in order to find a safer method whereby a high molecular weight polycarbodiimide can also be crosslinked, and, as a result, they have found that the presence of a catalytic amount of an alcoholate of an alkali metal or of an alkaline earth metal is effective to an addition reaction between a polycarbodiimide and a hydroxy-bearing compound and that the alcoholate is also effective to an addition reaction between a polycarbodiimide and a mercapto-bearing compound.

Particularly, they have found that a high molecular weight polycarbodiimide, which has a lower reactivity than a low molecular weight carbodiimide, reacts in the above-described process in a short period of time and quantitatively at room temperature.

They have achieved the present invention based on the discovery that the addition of an alcoholate of an alkali metal or of an alkaline earth metal is also effective to the crosslinking reaction of a polycarbodiimide by a compound having two or more hydroxy or mercapto groups.

That is, the method for preparing a crosslinked polycarbodiimide according to the present invention is characterized in that a polycarbodiimide compound is reacted with a compound which has in a molecule thereof two or more hydroxy or mercapto groups in the presence of an alcoholate of an alkali metal or of an alkaline earth metal.

In the present invention, preferred examples of the above-mentioned compounds which have in a molecule thereof two or more hydroxy or mercapto groups include a polyhydric alcohol.

In addition, other preferred examples of the above-mentioned compounds which have in a molecule thereof two or more hydroxy or mercapto groups include a silicone compound having two or more silanol groups per molecule.

The method for preparing a thermally crosslinked substance according to the present invention is characterized in that a crosslinked substance, which is prepared by reacting a polycarbodiimide compound with a compound having in a molecule thereof two or more hydroxy or mercapto groups in the presence of an alcoholate of an alkali metal or of an alkaline earth metal and which has an isourea or isothiourea linkage and a carbodiimide linkage, is thermally treated at a temperature in the range of 50° to 300° C. to crosslink the carbodiimide linkage present in the foregoing crosslinked substance.

The method for preparing a crosslinked substance according to the present invention is characterized in that a crosslinked substance, which is prepared by reacting a polycarbodiimide compound with a compound having in a molecule thereof two or more hydroxy or mercapto groups in the presence of an alcoholate of an alkali metal or of an alkaline earth metal and which has an isourea or isothiourea linkage and a carbodiimide linkage, is crosslinked by addition thereto a basic substance which promotes the trimerization of the carbodiimide linkage.

The method for preparing an inorganic material according to the present invention is characterized in that a crosslinked substance, which is prepared by reacting a polycarbodiimide compound with a compound having in a molecule thereof two or more hydroxy or mercapto groups in the presence of an alcoholate of an alkali metal or of an alkaline earth metal and which has an isourea or isothiourea linkage and a carbodiimide linkage, is thermally treated at a temperature in the range of 50° to 300° C. to further crosslink the carbodiimide linkage to thereby obtain a thermally crosslinked substance, and the foregoing thermally crosslinked substance is again thermally treated at a temperature in the range of 500° to 3000° C. to be converted into an inorganic substance.

The method for preparing an inorganic material according to the present invention is characterized in that a crosslinked substance, which is prepared by reacting a polycarbodiimide compound with a compound having in a molecule thereof two or more hydroxy groups in the presence of an alcoholate of an alkali metal or of an alkaline earth metal and which has an isourea or isothiourea linkage and a carbodiimide linkage, is further crosslinked by adding thereto a basic substance which promotes the trimerization of the carbodiimide linkage to obtain a crosslinked substance, and the foregoing crosslinked substance is thermally treated at a temperature in the range of 500° to 3000° C. to be converted into an inorganic substance.

According to the present invention, it is possible to carry out a quick reaction between a polymeric compound having a carbodiimide linkage and a compound having two or more hydroxy or mercapto groups and to easily obtain a crosslinked polymer which is difficult to obtain by an ordinary method. In addition, by utilizing the quantitative reactivity that is possible according to the present invention, the ratio between an isourea or thiourea linkage and a carbodiimide linkage can be controlled at will and easily by merely regulating the amount to be added of the compound having two or more hydroxy or mercapto groups.

In addition, since the reactivity between the carbodiimide linkage and a compound having two or more hydroxy or mercapto groups enables a compound, which has a variety of functions such as rubber elasticity and light response, to be easily introduced into a polymer, this reactivity can also be widely usable in the field of manufacture of highly functional materials. These highly functional materials may be used as a semiconductor sealing compound, a high density optical recording material and the like.

Besides, novel functional materials excellent in such properties as mechanical strength and thermal properties can be obtained by further crosslinking the carbodiimide linkage still remaining in a crosslinked substance. These novel functional materials may be used in such applications as heat resisting insulator materials and liquid crystal orientating materials.

Furthermore, inorganic materials having high-level heat resistance and tenacity can be obtained by heating and firing the aforedescribed crosslinked substances. These inorganic materials may be used in such applications as hard disk substrates and battery electrode materials.

BRIEF DESCRIPTION OF THE DRAWINGS

FIG. 1 shows an IR spectrum of a polymer obtained by crosslinking a polycarbodiimide by triethylene glycol.

DETAILED DESCRIPTION OF PREFERRED EMBODIMENTS

Polycarbodiimide is usually prepared by a method which consists in the decarboxylation of an organic diisocyanate in a hydrocarbon solvent such as toluene, xylene or decahydronaphthalene under heating. This method, however, generally provides an insoluble reaction product and therefore is not favorable to a subsequent crosslinking reaction with a compound having two or more hydroxy or mercapto groups. Because of this, a method, whereby a molecular weight is adjusted by controlling conditions including reaction temperature and reaction time as disclosed in Japanese Patent Application Laid-Open(JP-A) No 7-140,144 by the present inventors, is preferred.

Besides, a halogenated aliphatic hydrocarbon solvent such as tetrachloroethylene and an alicyclic ether solvent such as tetrahydrofuran, which are used in the methods disclosed in Japanese Patent Application Laid-Open(JP-A) Nos.2-292,316 and 4-279,618, are desirable as a starting material to be used in the method of the present invention because these solvents constitute a stable solvent for polycarbodiimide.

By the same reason, a halogenated aromatic hydrocarbon solvent which is described in Japanese Patent Application Laid-Open(JP-A) No.7-140,145 and an aromatic carboxylic acid ester which is used in a method now being applied for patent are adopted as a starting material.

Examples of organic diisocyanates include hexamethylene diisocyanate, phenylene diisocyanate, tolylene diisocyanate, methylene bis(4-phenylisocyanate) and naphthylene diisocyanate.

The present invention can be applied to any compound in a state of solution and having a plurality of carbodiimide linkages obtained by other methods. Generally, a usable polycarbodiimide is a compound having two or more, preferably five or more, carbodiimide linkages in a molecule thereof. Such a polycarbodiimide has a molecular weight preferably larger than 5000 in order to provide general properties as a polymer.

In the case where a polycarbodiimide is crosslinked by a compound having two or more hydroxy or mercapto groups, the polycarbodiimide is dissolved in a suitable solvent such as chlorobenzene or tetrachloroethylene, and then the solution is admixed with a compound having two or more hydroxy or mercapto groups along with an alcoholate of an alkali metal or of an alkaline earth metal. In a reaction system, where an alcoholate of an alkali metal or of an alkaline earth metal is not used, the crosslinking reaction hardly proceeds even if the system is held at a high temperature. However, in a reaction system, where an alcoholate of an alkali metal or of an alkaline earth metal is present, the reaction occurs at room temperature or at a temperature in its neighborhood for a short time and the compound having two or more hydroxy or mercapto groups reacts almost quantitatively. The added amount of the alcoholate of an alkali metal or of an alkaline earth metal is a catalytic amount and ranges from 0.1 to 20 mole percent, preferably from 0.5 to 10 mole percent, based on the carbodiimide linkage.

Examples of compounds having two or more hydroxy groups include polyhydric alcohols, such as ethylene glycol, hexamethylene glycol, triethylene glycol, catechol, 1,2,6-hexanetriol and 1,3-bis(3-hydroxypropyl)-1,1,3,3-tetramethyldisiloxane and silicone compounds having a plurality of silanols groups in a molecule thereof such as diphenylsilanediol and 1,4-bis(hydroxydimethylsilyl) benzene.

Examples of compounds having two or more mercapto groups include 1,2-ethanedithiol, 1,4-butanedithiol, 1,6-hexanedithiol, toluenedithiol, 1,3-bis(3-mercaptopropyl) tetramethyldisiloxane.

Compounds having one hydroxy group or one mercapto group are not inoperative, because crosslinking reactions with polycarbodiimides do not proceed.

Besides, the present invention is also effectively applicable to compounds having both a hydroxy group and a mercapto group in a molecule such as dithiothreitol and dithioerythritol.

The number of carbon atoms for alcoholates of an alkali metal or of an alkaline earth metal ranges from 1 to 30, preferably from 1 to 5. Examples of alcoholates of an alkali metal or of an alkaline earth metal include potassium methoxide, potassium ethoxide, sodium methoxide, sodium ethoxide, calcium dimethoxide and magnesium dimethoxide.

In the case where a polycarbodiimide is crosslinked by a compound having two or more hydroxy or mercapto groups, the resultant crosslinkage type is an isourea or isothiourea.

The added amount of a compound having two or more hydroxy or mercapto groups is less than that amount which will be deleterious to the moldability of the resultant crosslinked polymer. That is, the added amount is not limited so long as it does not produce gels or deposits in the case of a solution molding operation and is not limited so long as it allows the polymer to melt and the melt viscosity is not too high in the case of a powder molding operation. And, the ratio between the isourea or isothiourea linkage that will result from crosslinking and the carbodiimide linkage can be easily set to any value by controlling the amount to be added of a compound having two or more hydroxy or mercapto groups. Accordingly, the carbodiimide linkage, which has been left unconsumed, may be used to a variety of reactions.

The added amount of a compound having two or more hydroxy or mercapto groups is preferably less than 50 mol % and most preferably from 0.1 to 30 mol % based on the carbodiimide linkage.

The carbodiimide linkage, which has been left unconsumed in the above-described crosslinking reaction, can be crosslinked by means of a thermal treatment or trimerization to provide a polymer material having higher mechanical strength and heat resistance.

The heating of a polymer having a carbodiimide linkage may be conducted at a temperature in the range of 50° to 300° C., and preferably in the range of 100° to 260° C. The heating is preferably conducted in vacuum or in a non-oxidizing atmosphere such as in nitrogen or in argon. However, the heating may be conducted in air, if the temperature does not exceed 300° C. If the heating is conducted at a temperature below 50° C., self-crosslinking does not proceed. If the heating is conducted at a temperature above 300° C., organic groups are removed and mechanical strength deteriorates.

The catalytic crosslinking of the carbodiimide linkage can also be effected by a trimerization reaction through the addition of a basic substance such as 1,5-diazabicyclo[4.3.0] nonen, 1,4-diazabicyclo[2.2.2]octane or 1,8-diazabicyclo [5.4.0]-undecene. The added amount of the basic substance may be that amount which brings about a crosslinking rate acceptable to the molding operation and it ranges from 0.1 to 10 mole percent based on the carbodiimide linkage. The reaction temperature may be room temperature (-10~30° C.), but it will be more effective to heat the reaction system at a temperature not exceeding 200° C. and preferably at a temperature not exceeding 100° C. for the completion of the reaction in a shorter period of time. The reaction time is 1 to 60 minutes.

As a result of the crosslinking of the carbodiimine linkage, a polymeric material excellent in mechanical strength and heat resistance can be obtained.

A highly heat resisting inorganic material can be obtained by thermally treating the above-mentioned polymeric material at a temperature in the range of 500° to 3000° C., which temperature range is commonly adopted for the preparation of so-called glassy carbon, in vacuum or in a non-oxidizing atmosphere such as in nitrogen or in argon. If the temperature is below 500° C., the conversion of the polymeric material into an inorganic substance does not occur. If the temperature is above 300° C., the thermal treatment is not economical. In this case, a novel, highly heat resisting inorganic material can be obtained by appropriately selecting the type and quantity of a compound having two or more hydroxy or mercapto groups.

The present invention will be further clarified by the following examples, which should not be viewed as a limitation on any embodiment of the invention.

EXAMPLES

Synthesis Example 1

Preparation of Polycarbodiimide as a Material for Subsequent Reaction

Commercially available following ingredients, i.e., 5.40 g of 2,4-tolylene diisocyanate, 90 mg of phenylisocyanate, 12.0 mg of 3-methyl-1-phenyl-3-phosphorene-1-oxide and 50 ml of chlorobenzene as a solvent for reaction were heated and maintained at 120° C. for 3 hours under agitation in a nitrogen atmosphere to obtain polycarbodiimide.

The obtained solution of polycarbodiimide was cast onto a glass plate to make a layer, which was air-dried and then vacuum-dried to remove solvent. In this way, a polycarbodiimide film having a thickness of 40 μm was obtained, which was subjected to the measurement of tensile strength and the result is shown in Table 1.

TABLE 1

|  | Tensile Strength (kgf/cm2) |
| --- | --- |
| Synthesis Example 1 | 39 |
| Example 1 | 130 |
| Example 2 | 120 |
| Example 3 | 110 |
| Example 4 | 150 |
| Example 5 | 640 |
| Example 6 | 720 |
| Example 7 | 4100 |

Synthesis Example 2

Preparation of Polycarbodiimide as a Material for Subsequent Reaction

Commercially available following ingredients, i.e., 7.75 g of methylenebis(4-phenylisocyanate), 90 mg of phenylisocyanate, 12.0 mg of 3-methyl-1-phenyl-3-phosphorene-1-oxide and 50 ml of chlorobenzene as a solvent for reaction were heated and maintained at 120° C. for 1 hour under agitation in a nitrogen atmosphere to obtain polycarbodiimide.

Synthesis Example 3

Preparation of Polycarbodiimide as a Material for Subsequent Reaction

Commercially available following ingredients, i.e., 5.40 g of 2,4-tolylenediisocyanate, 90 mg of phenylisocyanate, 12.0 mg of 3-methyl-1-phenyl-3-phosphorene-1-oxide and 50 ml of tetrachloroethylene as a solvent for reaction were refluxed for 3 hours under agitation in a nitrogen atmosphere to obtain polycarbodiimide.

Example 1

Crosslinking of the Polycarbodiimide by Triethylene Glycol 0.062 g of triethylene glycol (in an amount of 5 mole percent per carbodiimide linkage) was added to a solution comprising 1.08 g of the polycarbodiimide (containing 8.3 m mol of carbodiimide linkage) obtained according to Synthesis Example 1 and 10 ml of chlorobenzene.

The above solution was admixed with 20 mg of 28% sodium methoxide/methanol solution (1.2 mole percent per carbodiimide linkage) to obtain a crosslinked polymer. The IR spectrum of the obtained crosslinked polymer is indicated as (2) in FIG. 1, which indicates the decrease in the absorption of carbodiimide-derived 2140 $cm^{-1}$ and the emergence of the absorption of isourea linkage-derived 1660 $cm^{-1}$, thereby indicating the formation of an isourea-type crosslinkage.

The crosslinked polymer solution was cast onto a glass plate to make a layer, which was air-dried and then vacuum-dried to remove solvent. In this way, a crosslinked polymer film having a thickness of 35 $\mu$m was obtained, which was subjected to the measurement of tensile strength and the result is shown in Table 1. The strength increased by crosslinking and the film exhibited flexibility.

Example 2

Crosslinking of the Polycarbodiimide by 1,6-hexanediol

A solution comprising 0.044 g of 1,6-hexanediol (in an amount of 5 mole percent per carbodiimide linkage) and 5 ml of tetrahydrofuran was added to a solution comprising 0.98 g of the polycarbodiimide (containing 8.3 m mol of carbodiimide linkage) obtained according to Synthesis Example 3 and 10 ml of trichloroethylene.

The above solution was admixed with 10 mg of 28% sodium methoxide/methanol solution (0.69 mole percent per carbodiimide linkage) to obtain a crosslinked polymer. As in the case of (2) of FIG. 1, the IR spectrum of the obtained crosslinked polymer indicated the emergence of the absorption of isourea linkage-derived 1660 $cm^{-1}$, thereby indicating the formation of an isourea-type crosslinkage.

The crosslinked polymer solution was cast onto a glass plate to make a layer, which was air-dried and then vacuum-dried to remove solvent. In this way, a crosslinked polymer film having a thickness of 35 $\mu$m was obtained, which was subjected to the measurement of tensile strength and the result is shown in Table 1. The strength increased by crosslinking and the film exhibited flexibility.

Example 3

Crosslinking of the Polycarbodiimide by 4-bis(hydroxydimethylsilyl)benzene

A solution comprising 0.19 g of 1,4-bis(hydroxydimethylsilyl)benzene (in an amount of 10 mole percent per carbodiimide linkage) and 5 ml of tetrahydrofuran was added to a solution comprising 1.08 g of the polycarbodiimide (containing 8.3 m mol of carbodiimide linkage) obtained according to Synthesis Example 1 and 10 ml of chlorobenzene.

The above solution was admixed with 10 mg of 28% sodium methoxide/methanol solution (0.62 mole percent per carbodiimide linkage) to obtain a crosslinked polymer. As in the case of (2) of FIG. 1, the IR spectrum of the obtained crosslinked polymer indicated the emergence of the absorption of isourea linkage-derived 1660 $cm^{-1}$, thereby indicating the formation of an isourea-type crosslinkage.

The crosslinked polymer solution was cast onto a glass plate to make a layer, which was air-dried and then vacuum-dried to remove solvent. In this way, a crosslinked polymer film having a thickness of 32 $\mu$m was obtained, which was subjected to the measurement of tensile strength and the result is shown in Table 1. The strength increased by crosslinking and the film exhibited flexibility.

Example 4

Crosslinking of the Polycarbodiimide by 1,3-bis(3-mercaptopropyl)tetramethyldisiloxane 0.11 g of 1,3-bis(3-mercaptopropyl)tetramethyldisiloxane (in an amount of 5 mole percent of hydroxy group per carbodiimide linkage) was added to a solution comprising 1.65 g of the polycarbodiimide (containing 8.0 m mol of carbodiimide linkage) obtained according to Synthesis Example 2 and 10 ml of chlorobenzene.

The above solution was admixed with 30 mg of 28% sodium methoxide/methanol solution (1.9 mole percent per carbodiimide linkage) to obtain a crosslinked polymer. The IR spectrum of the obtained crosslinked polymer indicated the emergence of the absorption of isothiourea linkage-derived 1625 $cm^{-1}$, thereby indicating the formation of an isothiourea-type crosslinkage.

The crosslinked polymer solution was cast onto a glass plate to make a layer, which was air-dried and then vacuum-dried to remove solvent. In this way, a crosslinked polymer film having a thickness of 38 $\mu$m was obtained, which was subjected to the measurement of tensile strength and the result is shown in Table 1. The strength increased by crosslinking and the film exhibited flexibility.

Example 5

Thermal Crosslinking of a Crosslinked Polymer having Isourea Linkage and Carbodiimide Linkage The crosslinked polymer film obtained according to Example 1 was thermally treated in vacuum at 200° C. for one hour to obtain a 32 $\mu$m thick film of crosslinked polymer.

The tensile strength of the obtained film is shown in Table 1, which indicates a significantly increased strength due to the crosslink formed by the thermal treatment while maintaining the flexibility.

Example 6

Crosslinking of a Crosslinked Polymer having Isourea Linkage and Carbodiimide Linkage by means of a Basic Substance The crosslinked polymer solution in chlorobenzene obtained according to Example 1 was admixed with 1,8-diazabicyclo[5.4.0]undecene in an amount of 1 mole percent per carbodiimide linkage, and the resultant mixture was cast onto a glass plate to make a layer, which was air-dried and then vacuum-dried and was further heated at 80° C. for one hour. In this way, a trimerization-crosslinked polymer film having a thickness of 28 μm was obtained.

The tensile strength of the obtained film is shown in Table 1, which indicates a significantly increased strength due to the trimerization-induced crosslink while maintaining the flexibility.

Example 7

Conversion of a Crosslinked Polymer into an Inorganic Substance

The crosslinked polymer film obtained according to Example 6 was heated in vacuum at 250° C. for five hours. Then, the film was subjected to stepwise heat treatments with progressively elevated temperatures consisting of 15 minutes at 250° to 300° C., 60 minutes at 300° to 500° C., 90 minutes at 500° to 1000° C., and 30 minutes at 1000° C. In this way, an inorganic film having a thickness of 25 μm was obtained.

The tensile strength of the obtained film is shown in Table 1. The observation of the surface of this inorganic film by means of SEM proved that the surface was very smooth and was almost free of defects such as bubble. The inorganic film was excellent in flexibility and toughness.

We claim:

1. A method for preparing a crosslinked polycarbodiimide, comprising reacting a polycarbodiimide compound with a compound, which has in a molecule thereof two or more hydroxy or mercapto groups, in the presence of an alcoholate of an alkali metal or of an alkaline earth metal.

2. The method of claim 1 wherein the compound, which has in a molecule thereof two or more hydroxy or mercapto groups, is a polyhydric alcohol.

3. The method of claim 1 wherein the compound, which has in a molecule thereof two or more hydroxy or mercapto groups, is a silicone compound having two or more silanol groups.

4. A method for preparing a thermally crosslinked polymer, comprising the steps of preparing a crosslinked polymer having an isourea or isothiourea linkage and a carbodiimide linkage by reacting a polycarbodiimide compound with a compound, which has in a molecule thereof two or more hydroxy or mercapto groups, in the presence of an alcoholate of an alkali metal or of an alkaline earth metal and thermally treating the crosslinked polymer at a temperature from about 50° to 300° C. to further crosslink the carbodiimide linkage in the crosslinked polymer.

5. A method for preparing a crosslinked polymer, comprising the steps of preparing a crosslinked polymer having an isourea or isothiourea linkage and a carbodiimide linkage by reacting a polycarbodiimide compound with a compound, which has in the molecule thereof two or more hydroxy or mercapto groups, in the presence of an alcoholate of an alkali metal or of an alkaline earth metal and crosslinking the crosslinked polymer by adding thereto a base which promotes the trimerization of the carbodiimide linkage.

6. A method for preparing an inorganic material, comprising the steps of preparing a crosslinked polymer having an isourea or isothiourea linkage and a carbodiimide linkage by reacting a polycarbodiimide compound with a compound, which has in a molecule thereof two or more hydroxy or mercapto groups, in the presence of an alcoholate of an alkali metal or of an alkaline earth metal, thermally treating the crosslinked polymer at a temperature from about 60° to 300° C. to further crosslink the carbodiimide linkage and thermally treating the thermally crosslinked polymer of the preceding step at a temperature from about 500° to 3000° C. to convert the thermally crosslinked polymer into an inorganic material.

7. A method for preparing an inorganic material, comprising the steps of preparing a crosslinked polymer having an isourea or isothiourea linkage and a carbodiimide linkage by reacting a polycarbodiimide compound with a compound, which has in a molecule thereof two or more hydroxy groups, in the presence of an alcoholate of an alkali metal or of an alkaline earth metal, further crosslinking the crosslinked polymer by adding thereto a base which promotes the trimerization of the carbodiimide linkage to obtain a crosslinked polymer and thermally treating the crosslinked polymer of the preceding step at a temperature from about 500° to 3000° C. to convert the crosslinked polymer into an inorganic material.

* * * * *